Patented Feb. 1, 1938

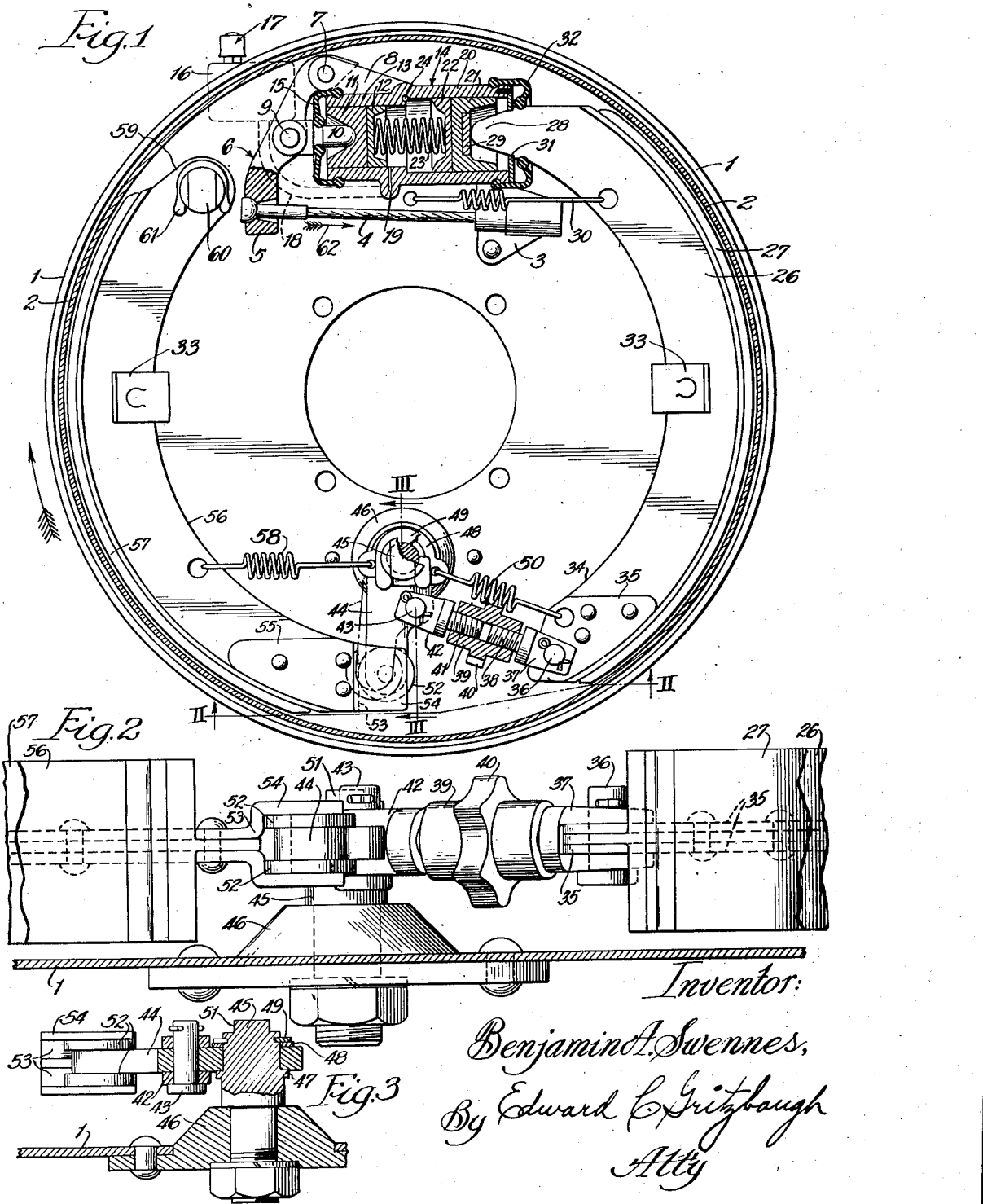

2,107,092

UNITED STATES PATENT OFFICE 2,107,092

BRAKE CONSTRUCTION

Benjamin A. Swennes, Rockford, Ill., assignor to Borg-Warner Corporation, Chicago, Ill., a corporation of Illinois Application August 26, 1936, Serial No. 97,934

3 Claims. (Cl. 188—152)

This invention has to do with brakes for wheels and more particularly with brakes of the servo type.

It is an object of the invention to provide a brake construction embodying the advantages of hydraulic and servo operation.

It is another object of the invention to provide a servo brake so constructed as to require a relatively light initiating force.

It is also an object of the invention to provide a servo brake mechanism including primary and secondary shoes with means whereby movement of the primary shoe is transmitted in a multiplied degree to the secondary shoe.

It is also an object of the invention to provide in a servo brake a thrust transmitting member operative to adjust the shoes relative to the brake surface.

Further objects and advantages of the invention will appear as the description proceeds.

The invention will be best understood by reference to the following description of an embodiment thereof shown in the accompanying drawing, wherein:

Fig. 1 is a section-elevation view of the invention.

Fig. 2 is an enlarged fragmentary section-elevation taken substantially as indicated by the line II—II in Fig. 1.

Fig. 3 shows details of construction, taken substantially as indicated by the line III—III in Fig. 1, but for convenience turned clockwise 90°.

In Fig. 1 there is shown brake shoe supporting means such as a mounting or backing plate 1 adapted to be fastened to the axle or axle housing and in cooperative relation with a brake drum 2 providing a brake surface for engagement with relatively movable brake means mounted on the plate. Mounted on the plate 1 is a bracket 3 affording a guide for a brake operating cable 4, the end of which has a universal connection with an arm 5 of a lever 6 pivoted at 7 to a bracket 8 mounted on the plate 1.

An intermediate portion of the lever 6 is pivotally connected at 9 to a push rod 10 having a preferably universal ball and socket engagement with a piston 11 provided with a packing cup 12, slidable in the reduced portion 13 of a combined master and secondary cylinder 14 mounted on the plate 1. The packing cup may be of leather, leather composition or other suitable material. A rubber or other preferably resilient boot 15 forms a fluid-tight joint between the reduced cylinder portion 13 and the push-rod 10, while permitting relative movement therebetween.

A reservoir 16 provided with a suitable air vent and filler cap 17 supplies liquid to the cylinder 14 through a tube 18 and a port 19, so located as to allow escape of liquid from the cylinder in response to expansion of the liquid and to permit liquid to enter the cylinder when the amount of liquid in the cylinder has been depleted due to contraction and other causes.

The inner part of the reduced cylinder portion 13 terminates in an enlarged cylinder portion 20 in which is disposed a piston 21 provided with a leather or other suitable packing cup 22. A compression spring 23 urges the pistons 11 and 21 apart, the ends of the springs being received in the cups 12 and 22, respectively. At any suitable point uppermost in the cylinder 14, such as at the juncture of the portions 13 and 20, a bleeder opening 24, suitably controlled as by a plug (not shown), is located.

A primary shoe 26 carries brake lining 27 for engagement with the brake surface of the drum 2 and is provided with a toe 28 urged against the bearing plate 29 carried by the piston 21. The toe 28 is illustrated in its "off" position, where it is urged by a return spring 30 connected to the shoe and to the mounting plate 1. To prevent the pressure of the spring 30 from building up pressure of fluid between the packing cups 12 and 22, and hence to avert deterioration of the cups, a stop plate 31 is secured to the free end of the enlarged cylinder portion 20 and provides a stop against which shoulders on the toe 28 abut as clearly shown in Fig. 1. A dust-proof joint between the cylinder enlargement 20 and the toe 28 is effected by a boot 32.

The shoe 26 is provided with a guide spring or clip 33 to cooperate with other means, such as the mounting plate 1, to assist in constraining the shoe to substantially planar movement.

The heel 34 of the shoe 26 is provided with a bracket 35 which is pivoted at 36 to a fork or clevis 37 having a threaded stem 38 threaded into a turn buckle 39 provided with a wrench hold or star 40. The turnbuckle 39 is oppositely internally threaded so as to receive the stem 38 and the oppositely threaded stem 41 of a clevis 42 pivoted at 43 to an intermediate portion of an arm or link 44, one end of which is pivotally anchored by a pin 45 to the mounting or backing plate 1.

The pivot pin 45 is anchored in a reinforcing block 46 secured to the plate and is provided with a shoulder 47 between which and a washer 48 the arm 44 is received. Axial movement of the arm on the pin is prevented by a retaining C spring 49 snapped into a groove in the pin 45. A brake shoe return spring 50 is secured to the bracket 35 on the shoe 26 and to an ear on the washer 48, and is adapted to fit between adjacent teeth of the star 40 on the turnbuckle 39 to prevent accidental change in adjustment of the turnbuckle.

The pivot pin is cut to provide flats forming a wrench hold 51.

The arm 44 at its other end is straddled by a pair of rollers 52 adapted to engage the bight 53 of a fork 54 extending free on the bracket 55 secured to a secondary brake shoe 56 provided with brake lining 57. A spring 58 connected to an ear on the washer 49 and to the secondary shoe 56 constantly urges said shoe to the "off" or released position, and accordingly urges the bight 53 into engagement with the rollers 52 carried by the arm 44.

A guide spring or clip 33 attached to the shoe 56 cooperates with the mounting plate 1 or other suitable structure, to constrain the shoe 56 to movement substantially in a single plane.

The shoe 56 is pivotally anchored at its other end 59 to a pin 60 which may be similar to the pin 45, and is retained by a C spring 61 similar to the spring 49 hereinbefore referred to.

From the foregoing, it will be observed that when it is desired to apply the brake, means under the control of the driver, or, if desired, automatically operable, exerts a pull on the cable 4 in the direction indicated by the arrow 62, causing the push rod 10 to thrust the piston 11 to the right as seen in Fig. 1. This pressure is transmitted in an increased degree, due to the difference in area between the two pistons, to the driven piston 21, forcing the primary shoe 26 in a combined radial and circumferential path. This movement of the shoe 26 brings the lining 27 thereof into engagement with the friction surface of the drum 2, and as the latter rotates, it moves the shoe 26 in a direction toward the secondary shoe 56. This movement of the shoe 26 causes the clevis 37 and turnbuckle 39 to thrust the clevis 42 against the arm 44, turning the latter clockwise about the anchor pin 45 so as to force the rollers 42 against the bight 53 of the bracket 55. The swinging of the arm 45 causes the rollers 52 to move the secondary shoe 56 outwardly about the pivot pin 60, where the shoe is anchored to the relatively stationary plate 1, the lining 57 of said shoe being thereby forcibly engaged with the friction surface of the rotating drum 2.

It will be appreciated that a relatively slight pressure of the push rod 10 on the piston 11 is necessary to bring the primary shoe 26 into engagement with the drum 2. Thereafter, the drum itself, due to its relative rotation, is effective to cause both primary and secondary shoes to more tightly grip the same. As the drum initially turns the shoe 26, forcing the lining 57 initially into engagement with the drum, said shoe 56 offers greater resistance to its movement by the shoe 26, which is thereby caused to grip the drum more tightly, resulting in greater pressure of the secondary shoe 56 against the drum, and this action continues as is well understood by those skilled in the art of servo brake mechanisms until the desired brake engagement and braking effect are obtained. Upon release of the pull on the cable 4, the springs 30, 50 and 58 serve to break the grip between the shoes and the drum, returning the shoes to release or "off" positions as shown in Fig. 1.

The pivot 43 is substantially closer to the axis of the pivot pin 45 than is any portion of the bight adapted to be engaged by the rollers 52. Accordingly a relatively slight movement of the clevis 42 in the direction of the arm 44, due to a correspondingly slight rotation of the primary shoe 26 by the piston 21 and drum 2, will result in a substantially increased degree of movement of the secondary shoe 56 toward the friction surface of the drum 2.

It will be observed that the invention is of such character as to adapt it to conventional motor vehicles since the employment of the combination hydraulic and mechanical means requires no reorganization of brake linkage. The cable 4, lever 6 and bracket 8 are of a character to be found on present day installations of the mechanical type, and this is also substantially true of the push rod 10.

It is also to be noted that the resistance offered by the arm 44 and shoe 56 to the turning of the primary shoe 26 is exerted in such a path as to cause the outer end of the turnbuckle link to swing outwardly so as to swing the heel 34 of the shoe 26 outwardly in a direction tending to wedge the shoe 26 against the drum 2, which then increases the thrust on the arm and secondary shoe, producing a servo action.

I am aware that many changes may be made and numerous details of construction may be varied through a wide range without departing from the principles of this invention, and I therefore do not purpose limiting the patent granted hereon otherwise than by the appended claims

I claim as my invention:

1. In a servo brake, a brake drum, a plate, a primary brake shoe, means for initiating engagement of said shoe by said drum, a secondary shoe, a forked extension on said secondary shoe, a pivoted lever mounted on said plate, rollers on the free end of said lever, and a link connecting said primary brake shoe to a point on said lever intermediate the rollers and pivot thereof, whereby a change in the spacing between said primary and secondary brake shoe as a result of the application of braking pressure is effectuated by a shift in position of said rollers on said extension.

2. In a servo brake, a brake drum, a plate, a primary brake shoe, and means on said plate for initiating engagement of said shoe by said drum, said means comprising a pair of cylinders having a communicating passage therebetween, one of said cylinders being of greater diameter than the other, pistons in each cylinder, external mechanical control means for actuating the smaller piston, a bearing surface on the open end of the larger piston and adapted to bear against one end of said primary brake shoe, fluid intermediate said pistons, a port for admitting said fluid into one of the cylinders, and compressible means tending to separate said pistons to expose said port and relieve the pressure between the pistons.

3. The combination as described in claim 2, said cylinders being coaxial and said compressible means comprising a coil spring mounted between said pistons and bearing upon adjacent surfaces thereof.

BENJAMIN A. SWENNES.